United States Patent
Lee (10) Patent No.: US 12,215,821 B2
(45) Date of Patent: Feb. 4, 2025

(54) TELESCOPIC MAST WITH BUILT-IN BELT ROPES

(71) Applicant: Jong Hee Lee, Seoul (KR)

(72) Inventor: Jong Hee Lee, Seoul (KR)

(73) Assignee: Jong Hee Lee, Seoul (KR)

( * ) Notice: Subject to any disclaimer, the term of this patent is extended or adjusted under 35 U.S.C. 154(b) by 0 days.

(21) Appl. No.: 18/728,071

(22) PCT Filed: Oct. 31, 2022

(86) PCT No.: PCT/KR2022/016777
§ 371 (c)(1),
(2) Date: Jul. 10, 2024

(87) PCT Pub. No.: WO2023/146068
PCT Pub. Date: Aug. 3, 2023

(65) Prior Publication Data
US 2024/0410520 A1 Dec. 12, 2024

(30) Foreign Application Priority Data

Jan. 27, 2022 (KR) ........................ 10-2022-0012728

(51) Int. Cl.
*E04H 12/18* (2006.01)
*E04B 1/343* (2006.01)
(Continued)

(52) U.S. Cl.
CPC ......... *F16M 11/28* (2013.01); *E04B 1/34305* (2013.01); *E04H 12/182* (2013.01); *H01Q 1/10* (2013.01)

(58) Field of Classification Search
CPC ... E04H 12/182; F16M 11/28; E04B 1/34305; H01Q 1/10
(Continued)

(56) References Cited

U.S. PATENT DOCUMENTS

| | | | | |
|---|---|---|---|---|
| 6,491 A | * | 6/1849 | Cox | E04H 12/182 52/121 |
| 133,017 A | * | 11/1872 | Davis | E04H 12/182 285/317 |

(Continued)

FOREIGN PATENT DOCUMENTS

| | | |
|---|---|---|
| JP | 2000-240324 | 9/2000 |
| KR | 10-1794300 | 11/2017 |

(Continued)

OTHER PUBLICATIONS

"PCT International Search Report and Written Opinion for International Application No. PCT/KR2022/016777, Date of Mailing: Feb. 6, 2023".

*Primary Examiner* — Brent W Herring (57) ABSTRACT

A telescopic mast with built-in belt ropes is disclosed. A telescopic mast with built-in belt ropes according to an embodiment of the present disclosure may include a plurality of joint bodies having different outer diameters, a plurality of belt ropes connecting the joint bodies in order to operate the joint bodies simultaneously, collar parts coupled to tops of the respective joint bodies, in which guide rollers that guide the movement of the belt ropes are embedded in one side and the other side on an opposite portion thereof, a belt rope stator coupled to a bottom of a lowermost joint body having the largest diameter among the plurality of joint bodies, to which both ends of any one belt rope are fixed, and belt rope guides coupled to bottoms of the respective joint bodies excluding the lowermost joint body, to which both ends of any one belt rope are fixed and the other belt rope is movably coupled, wherein the plurality of joint bodies are assembled to overlap one another to constitute a telescopic structure whose length is adjustable, the remaining belt ropes excluding a lowermost belt rope among the plurality of belt ropes connect two joint bodies spaced apart from (Continued)

each other with one joint body in the middle therebetween, and the belt ropes connecting two joint bodies spaced apart from each other pass into a joint body positioned in the middle of the two joint bodies to be connected.

9 Claims, 8 Drawing Sheets

(51) Int. Cl.
 *F16M 11/28* (2006.01)
 *H01Q 1/10* (2006.01)
(58) Field of Classification Search
 USPC .................................................. 52/118, 121
 See application file for complete search history.

(56) References Cited

U.S. PATENT DOCUMENTS

| | | | | |
|---|---|---|---|---|
| 2,675,211 | A * | 4/1954 | Regoord | E04H 12/182 254/387 |
| 3,248,831 | A * | 5/1966 | Jones | H01Q 1/10 52/121 |
| 3,745,725 | A * | 7/1973 | Boucaud | E04B 1/34305 254/387 |
| 4,785,309 | A * | 11/1988 | Gremillion | H01Q 1/1235 343/901 |
| 5,101,215 | A * | 3/1992 | Creaser, Jr. | E04H 12/182 52/118 |
| 6,046,706 | A * | 4/2000 | Vargas | H01Q 1/1235 343/903 |
| 11,624,199 | B2 * | 4/2023 | Falck-Schmidt | B60Q 1/2657 52/111 |
| 2009/0110527 | A1 * | 4/2009 | Kardohely | E04H 12/182 414/567 |
| 2021/0095492 | A1 | 4/2021 | Falck-Schmidt | |

FOREIGN PATENT DOCUMENTS

| | | |
|---|---|---|
| KR | 10-2172251 | 10/2020 |
| KR | 10-2377037 | 3/2022 |

\* cited by examiner

TELESCOPIC MAST WITH BUILT-IN BELT ROPES

TECHNICAL FIELD

The present disclosure relates to a telescopic mast in which a plurality of joint bodies are connected to one another in a mutually interlocking manner so as to be lifted (extended) or lowered (contracted) simultaneously, and more particularly, to a telescopic mast with built-in belt ropes in which the belt ropes that operate the joint bodies simultaneously are not exposed to the outside.

BACKGROUND ART

In general, a belt rope type telescopic mast is a device used to expand the observation range of a surveillance apparatus or improve the communication performance of a communication apparatus by mounting a video apparatus such as a camera or a communication apparatus such as an antenna at an uppermost end thereof and levitating the apparatus to a height of 5 to 22 meters above the ground.

The belt rope type telescopic mast is configured with a telescopic structure in which a number of cylindrical joint bodies having different diameters are assembled such that at least portion thereof overlaps one another to adjust a length thereof, and has a structure in which the joint bodies are interlocked with one another by a belt rope coupled to each joint body to be lifted or lowered simultaneously.

Since such as a belt rope type telescopic mast is mainly used outdoors, it is greatly influenced by an external environment. In particular, the belt rope, which is activated to simultaneously elevate a plurality of joint bodies, is a component that must be replaced periodically as its durability such as tensile strength, impact resistance, ultraviolet blocking ability, and breaking load gradually deteriorates over time.

Moreover, in a structure in which the belt rope is exposed to the outside as it is, like most conventional belt rope type telescopic masts, the harsher the use environment of the apparatus is, the more rapidly the belt rope deteriorates, thereby causing serious damage that greatly affects safety during the use of the apparatus. Accordingly, there is an urgent need to provide countermeasures to solve the problems caused by the belt rope being exposed to the outside.

PRIOR PATENT LITERATURE (Patent Document 1) Korean Patent Publication No. 10-2000-0054348 (published on Sep. 5, 2000)

(Patent Document 2) Korean Patent Registration No. 10-2172251 (registered on Oct. 26, 2020)

DISCLOSURE

Technical Problem

A technical problem to be solved by the present disclosure is to provide a telescopic mast with built-in belt ropes that can solve the problem of rapid deterioration conventionally caused by a belt rope being exposed to a harsh external environment by allowing the belt rope that activates joint bodies simultaneously to be built in the mast so as not to be exposed to the outside.

Technical Solution

According to an embodiment of the present disclosure as a means of solving the problem, there is provided a telescopic mast with built-in belt ropes, and the telescopic mast may include:

a plurality of joint bodies having different outer diameters in a hollow tube structure;

a plurality of belt ropes connecting the plurality of joint bodies in order to operate the joint bodies simultaneously;

collar parts coupled to tops of the respective joint bodies, in which guide rollers that guide the movement of the belt ropes are embedded in one side and the other side on an opposite portion thereof;

a belt rope stator coupled to a bottom of a lowermost joint body having the largest diameter among the plurality of joint bodies, to which both ends of any one belt rope are fixed; and belt rope guides coupled to bottoms of the respective joint bodies excluding the lowermost joint body, to which both ends of any one belt rope are fixed and the other belt rope is movably coupled, wherein the plurality of joint bodies are assembled to overlap one another to constitute a telescopic structure whose length is adjustable, the remaining belt ropes excluding a lowermost belt rope among the plurality of belt ropes connect two joint bodies spaced apart from each other in an interlocking manner with one joint body in the middle therebetween, and the belt ropes connecting two joint bodies spaced apart from each other pass into a joint body positioned in the middle of the two joint bodies to be connected so as not to be exposed to the outside.

In the present disclosure, the plurality of belt ropes may consist of one drive belt rope and a plurality of interlocking belt ropes.

Here, at least portion of the drive belt rope may be movably coupled to a belt rope guide coupled to a bottom of a second joint body at one stage above a lowermost joint body, and the other portion may pass through a collar part of the lowermost joint body such that either one of both ends thereof is fixed to the collar part and the other end thereof is connected to an external drive device.

Furthermore, at least portion of the plurality of interlocking belt ropes may be movably coupled to a belt rope guide of the any one joint body, and both ends thereof may pass into a joint body positioned in the middle to be fixed to a belt rope guide or belt rope stator of a joint body positioned two stages below.

Furthermore, the belt rope stator applied to the present disclosure may be integrally provided with a stator insertion part inserted into and fixed to a bottom of a lowermost joint body using a press-fitting method at a top thereof, and provided with stator belt fixing holes in which one end and the other end of a belt rope extending by passing into a joint body are respectively passed therethrough and then fixed with fixing pins in one side thereof and the other side on an opposite portion thereof.

In addition, the belt rope guide may be integrally provided with a guide insertion part inserted into and fixed to a bottom opening of a joint body using a press-fitting method at a top thereof, disposed with a belt coupling part surrounded by a belt detachment prevention member on a lower surface thereof, provided with guide belt fixing holes in which one end and the other end of a belt rope extending by passing into a joint body are respectively passed therethrough and then fixed with fixing pins in one side thereof and the other side on an opposite portion thereof, and disposed with belt passage grooves in one outer surface portion thereof and the other outer surface portion on an opposite portion thereof.

Here, the belt coupling part and belt passage groove of any one belt rope guide may be disposed at different positions from those of another belt rope guide positioned at one stage above or below.

For example, the belt coupling part and belt passage groove of one belt rope guide and those of another belt rope guide positioned at one stage above or below may be disposed to be offset from each other by 90 degrees.

Preferably, drainage holes may be disposed in the belt rope stator and the belt rope guide, respectively.

In addition, at least two or more elevation guide grooves may be disposed on an inner peripheral surface of each of the collar parts in a longitudinal direction of the joint body, and an elevation rail corresponding to the elevation guide groove may be disposed in an outer surface portion of each of the remaining joint bodies excluding the lowermost joint body in a longitudinal direction of the joint body, thereby preferably allowing the simultaneous elevation operation of the joint bodies to be efficiently implemented with no rotation.

Advantageous Effects

In a telescopic mast with built-in belt ropes according to an embodiment of the present disclosure, the belt ropes that operate joint bodies simultaneously may not be exposed to the outside as they are built into the joint bodies, and due to this, rapid deterioration of the belt ropes occurring when the belt ropes are exposed to an external environment and subsequent serious damage that affects safety during the use of the apparatus may be prevented.

MODE FOR INVENTION

Hereinafter, a preferred embodiment of the present disclosure will be described in detail with reference to the accompanying drawings.

In describing the present disclosure, it should be noted that the terms used herein are merely used to describe a specific embodiment, but not to limit the present disclosure. As used herein, the singular forms are intended to include the plural forms as well, unless the context clearly indicates otherwise.

In addition, terms "include" or "have" used herein should be understood that they are intended to indicate the presence of a feature, a number, a step, an element, a component or a combination thereof disclosed in the specification, and it may also be understood that the presence or additional possibility of one or more other features, numbers, steps, elements, components or combinations thereof are not excluded in advance.

Moreover, although terms of "first," "second," and the like are used to explain various components, the components are not limited to such terms. The terms are used merely for the purpose to distinguish an element from the other element.

In the description with reference to the accompanying drawings, the same elements are designated with the same numeral references and redundant description thereof will be omitted. Furthermore, in describing the present disclosure, the detailed description will be omitted when a specific description for publicly known technologies to which the invention pertains is judged to obscure the gist of the present disclosure.

Figure 1:
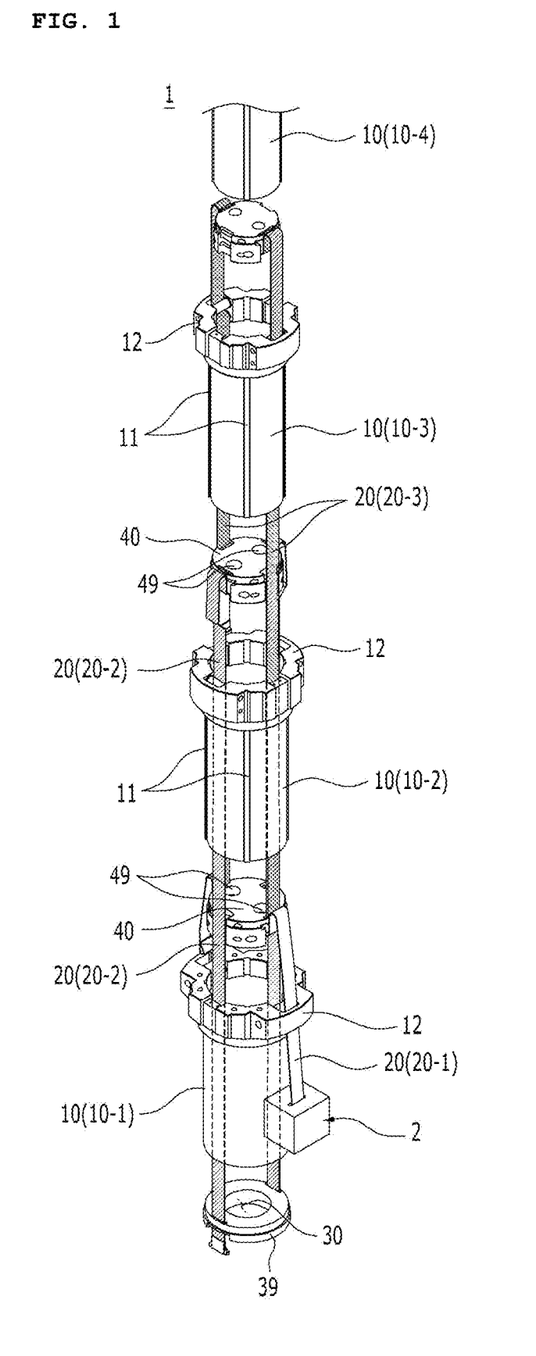
FIG. 1 is an exploded perspective view showing a main configuration of a telescopic mast with built-in belt ropes according to an embodiment of the present disclosure.
Figure 2:
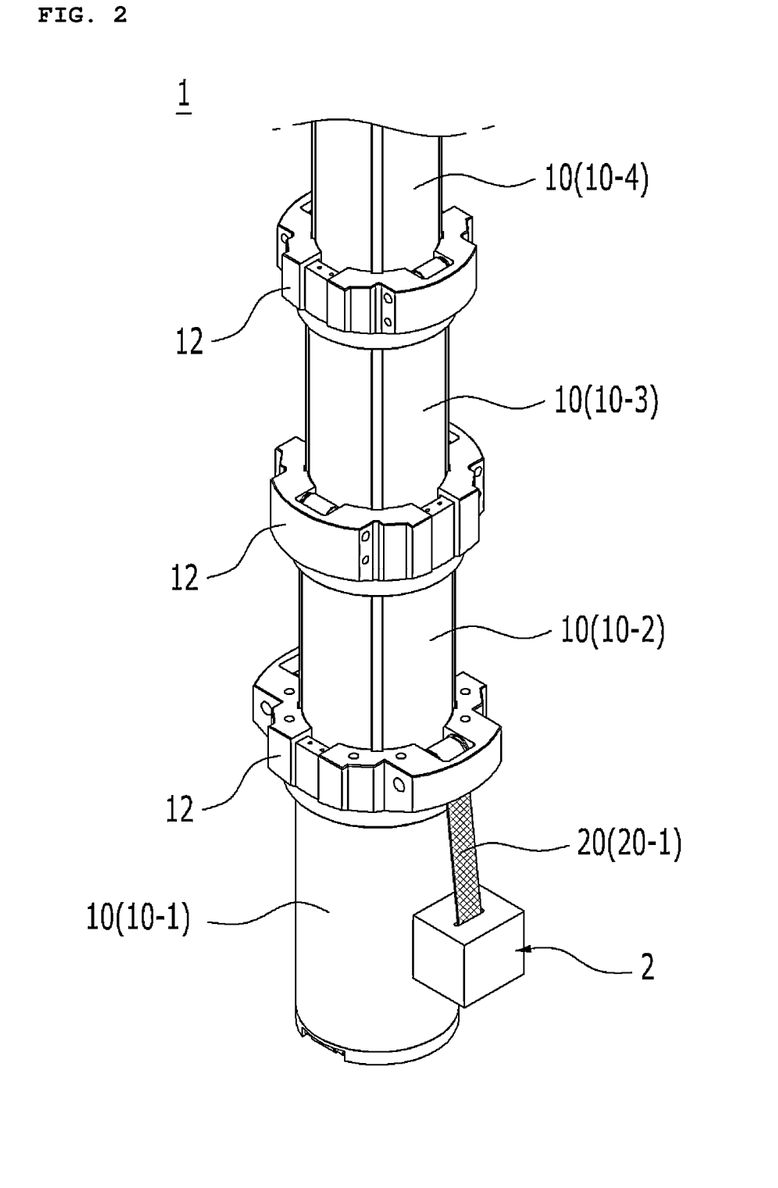
FIG. 2 is a combined perspective view of the telescopic mast shown in FIG. 1.

FIG. 1 is an exploded perspective view showing a main configuration of a telescopic mast with built-in belt ropes according to an embodiment of the present disclosure, and FIG. 2 is a combined perspective view of the telescopic mast shown in FIG. 1. Furthermore, FIG. 3 is a schematic cross-sectional view schematically showing an internal configuration of a telescopic mast with built-in belt ropes in a coupled state according to an embodiment of the present disclosure.

Figure 3:
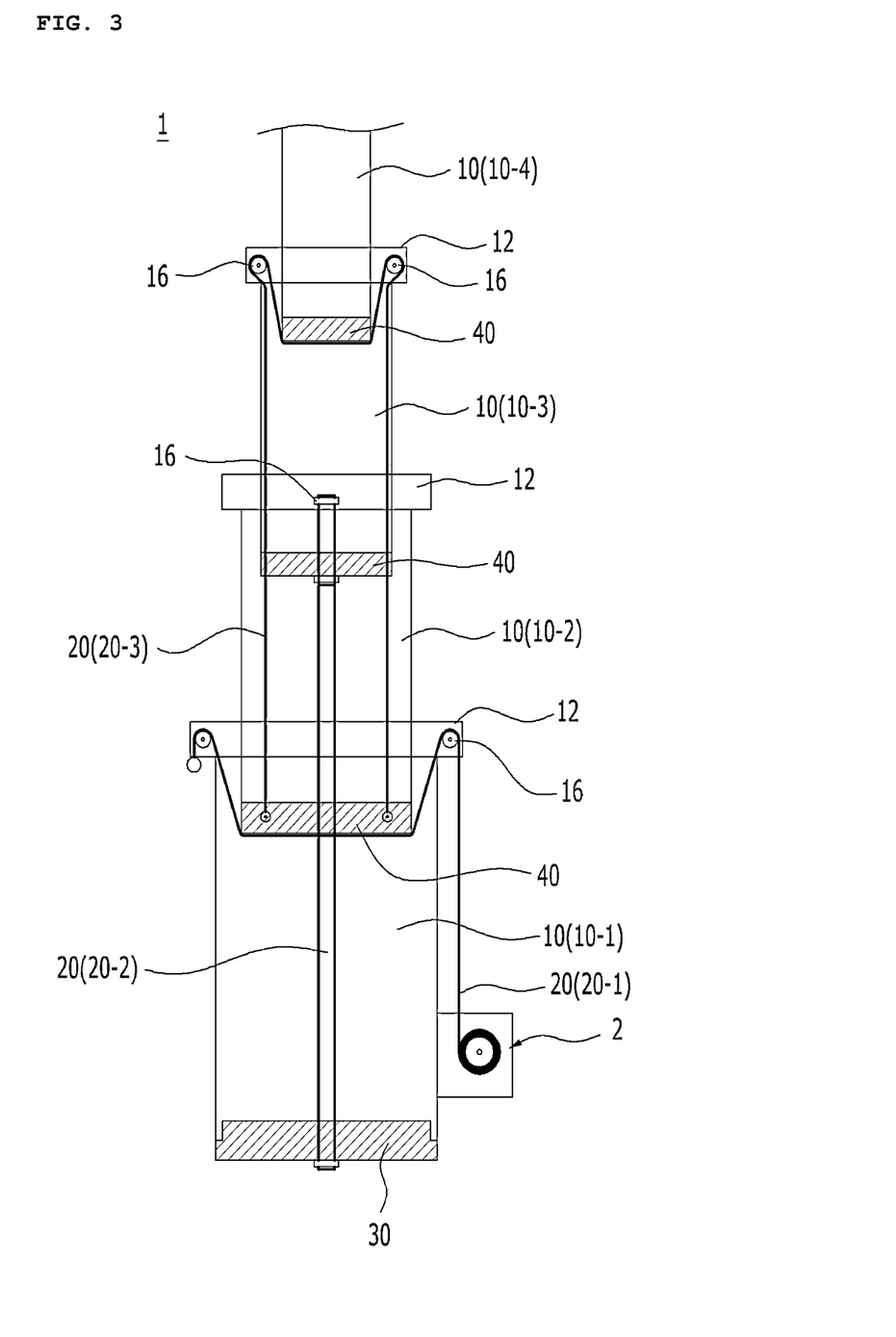
FIG. 3 is a schematic cross-sectional view schematically showing an internal configuration of a telescopic mast with built-in belt ropes in a coupled state according to an embodiment of the present disclosure.

Referring to FIGS. 1 to 3, a telescopic mast 1 with built-in belt ropes according to an embodiment of the present disclosure has a hollow tube structure mainly consisting of a plurality of joint bodies 10 having different outer diameters, on the basis of a telescopic structure in which the plurality of joint bodies 10 having different outer diameters are assembled to overlap one another so as to be adjusted to a desired length.

Each of the plurality of joint bodies 10 having different outer diameters is preferably a cylindrical pipe as shown in an example in the drawing (FIG. 1), but is not necessarily limited to a cylindrical shape. As long as it is a tube-shaped structure with different diameters that are assembled to overlap one other so as to be adjusted to a desired length, it is also allowed to employ a tube-shaped structure with a polygonal cross-sectional shape.

The joint bodies 10 having different outer diameters are connected to one another in an interlocking manner using a plurality of belt ropes 20. More specifically, the joint bodies 10 are connected one another in an interlocking manner through the plurality of belt ropes 20 to perform a simultaneous elevation operation such that when a joint body 10-2 positioned at a lower stage is lifted, a joint body 10-3 positioned at an upper stage is also lifted, and when the joint body 10-2 positioned at the lower stage is lowered, the joint body 10-3 at the upper stage is also lowered.

A collar part 12 is coupled to the top of each joint body 10. The collar part 12 mainly functions as a stopper to limit a lowering height to a predetermined level so as not to allow the joint body 10 at an upper stage to be completely inserted into the joint body 10 at a lower stage that accommodates it during the lowering (contraction) of the mast. To this end, the collar part 12 may be disposed to have an outer diameter that is at least larger than an outer diameter of the joint body 10 to which the collar part 12 is coupled.

A belt rope stator 30 may be coupled to a bottom of a lowermost joint body 10-1, which has the largest diameter among the plurality of joint bodies 10. Both ends of a first interlocking belt rope 20-2 among a plurality of interlocking belt ropes 20, which will be described later, may be fixed to the belt rope stator 30, and a belt rope guide 40 may be coupled to a bottom of each joint body 10 excluding the lowermost joint body 10-1.

Here, both ends of any one belt rope 20 may be fixed to the belt rope guide 40 and another belt rope 20 may be movably coupled thereto.

As mentioned above, the joint bodies 10 may be allowed to overlap one another or may be drawn out with respect to one another simultaneously. Such a simultaneous operation may be implemented by a configuration that the remaining belt ropes 20-2, 20-3 excluding the lowest belt rope 20-1 among the plurality of belt ropes 20 connect two joint bodies 10-3 and 10-1, 10-4 and 10-2 spaced apart from each other in an interlocking manner, with one joint body 10-2, 10-3 in the middle therebetween.

Specifically, the plurality of belt ropes 20 may be configured with one drive belt rope 20-1 and two or more interlocking belt ropes 20-2, 20-3, . . .

At least portion of the drive belt rope 20-1 may be movably coupled to the belt rope guide 40 at a lower stage of the second joint body 10-2 at one stage above the lowermost joint body 10-1. Furthermore, one of both ends of the drive belt rope 20-1 may be fixed to the collar part 12, and the other end thereof may pass through the collar part 12 of the lowermost joint body 10-1 to be connected to an external drive device 2 (see FIGS. 7A and 7B) such as a winch.

Here, an external drive device 2 such as a winch may be mounted on an outer surface of the lowermost joint body 10-1, but is not limited thereto, and at both ends of the drive belt rope 20-1, a fixed end portion opposite to a portion connected to the external drive device 2 may be fixed to the collar part 12 as shown in an example in the drawing, or may be extended downward and fixed to a target surface on which the mast is installed.

At least portion of the plurality of interlocking belt ropes 20-2, 20-3, . . . may be movably coupled to the belt rope guides 40 at lower stages of the remaining joint bodies 10-3, 10-4, . . . excluding the lowermost joint body 10-1 and the second joint body 10-2 at an upper stage thereof, and both ends thereof may pass into a joint body positioned in the middle to be fixed to the belt rope guide 40 or belt rope stator 30 at a lower stage of a joint body positioned two stages below.

For example, as shown in the example of FIG. 1, among the interlocking belt ropes 20, at least portion of the first interlocking belt rope 20-2 may be movably coupled to a bottom of the belt rope guide 40 positioned at two stages above the lowermost joint body 10-1, and both ends thereof may pass into the second joint body 10-2 positioned at one stage therebelow to be fixed to the belt rope stator 30 at a bottom of the lowermost joint body 10-1.

In addition, among the interlocking belt ropes 20, at least portion of the second interlocking belt rope 20-3 at one stage above the first interlocking belt rope 20-2 may be movably coupled to the belt rope guide 40 at a bottom of the fourth joint body 10-4 positioned at one stage above the third joint body 10-3, and both ends thereof may pass into the third joint body 10-3 to be fixed to the belt rope guide 40 at a bottom of the second joint body 10-2.

In this manner, in the present disclosure, a mechanism in which a plurality of joint bodies are simultaneously elevated may be implemented by connecting two joint bodies spaced apart from each other in a mutually interlocking manner with one joint body in the middle therebetween through the interlocking belt ropes 20.

Here, in the present disclosure, since the interlocking belt ropes 20-2, 20-3, . . . pass into the joint body positioned in the middle of the two joint bodies to be connected, the interlocking belt ropes are not exposed to the outside.

That is, in the telescopic mast 1 with built-in belt ropes according to an embodiment of the present disclosure, belt ropes (a plurality of interlocking belt ropes) that operate joint bodies 10 simultaneously may be built into the joint bodies so as not to be exposed to the outside, and due to this, rapid deterioration of the belt ropes occurring when the belt ropes are exposed to an external environment and subsequent serious damage that affects safety during the use of the apparatus may be prevented.

Figure 4:
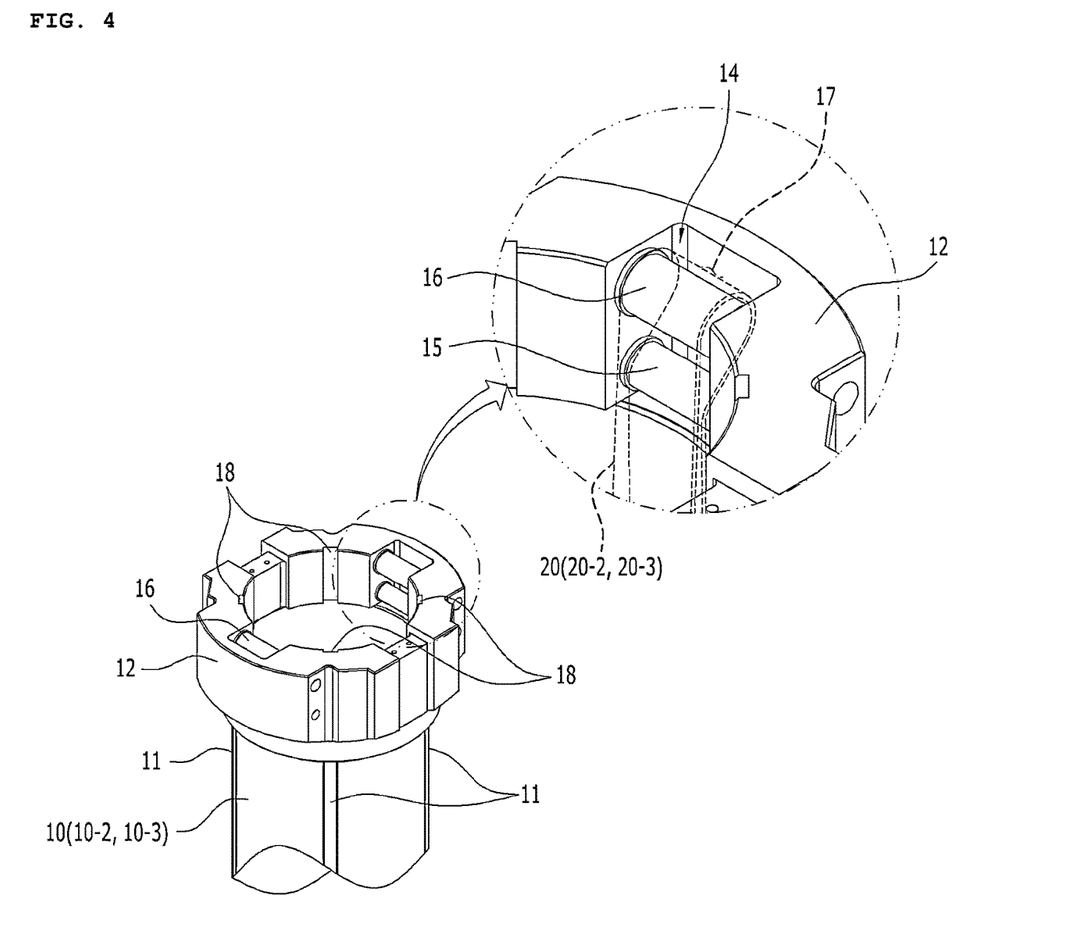
FIG. 4 is an enlarged view of a collar part coupled to a top of a joint body.

FIG. 4 is an enlarged view of a collar part coupled to a top of a joint body.

Referring to FIG. 4, as mentioned above, the collar part 12 mainly functions as a stopper to limit a lowering height to a predetermined level so as not to allow the joint body 10 at an upper stage to be completely inserted into the joint body 10 at a lower stage that accommodates it during the lowering (contraction) of the mast, but also serves, when a force is applied to the belt rope 20 for simultaneously operating the joint bodies 10, to change a direction of the force.

To this end, the collar part 12 may be provided with guide rollers 16 that change, when a tensile force for lifting the joint body 10 is applied to the belt rope 20, a direction in which the tensile force acts while guiding the movement of the belt rope 20. Here, the guide rollers 16 may be rotatably embedded in roller insertion parts 14 that are symmetrically disposed in one side of the collar part 12 and the other side on an opposite portion thereof with respect to the center of the collar part 12.

The guide rollers 16 may be rotatably coupled to positions spaced apart from inner walls of the roller insertion parts 14 by a predetermined distance, and therefore slits may be disposed between the guide rollers 16 and the inner walls of the roller insertion parts 14.

The belt rope 20 disposed inside the joint body may pass through the slits 17 from the bottom to the top in the drawing, then wrap around an upper outer surface portion of the guide roller 16 to be turned downward inside the joint body 10 and coupled to the belt rope guide 40 at a stage immediately above the joint body 10.

Preferably, an auxiliary guide roller 15 that guides the roller insertion part 14 to extend in a direction of the guide roller 16 disposed thereon while preventing it from being in contact with an inner wall of the roller insertion part 14 may be further provided at a bottom of the guide roller 16.

At least two or more elevation guide grooves 18 disposed in a longitudinal direction of the joint body 10 may be disposed on an inner peripheral surface of the collar part 12. Furthermore, on an outer peripheral surface of each joint body 10-2, 10-3, . . . excluding the lowermost joint body 10-1, elevation rails 11 may be disposed continuously in a longitudinal direction of the joint body 10 to correspond to the respective elevation guide grooves 18 (see FIG. 1). Due to this, simultaneous elevation of the joint bodies may be implemented efficiently with no rotation.

Although not shown, the same operation and effect may be achieved even when, contrary to the above, elevation rails are disposed on an inner peripheral surface of the collar part 12 and elevation guide grooves are disposed on an outer peripheral surface of the joint body. Therefore, it should be noted that such a modified example may also be included in the scope of the present disclosure.

Figure 5:
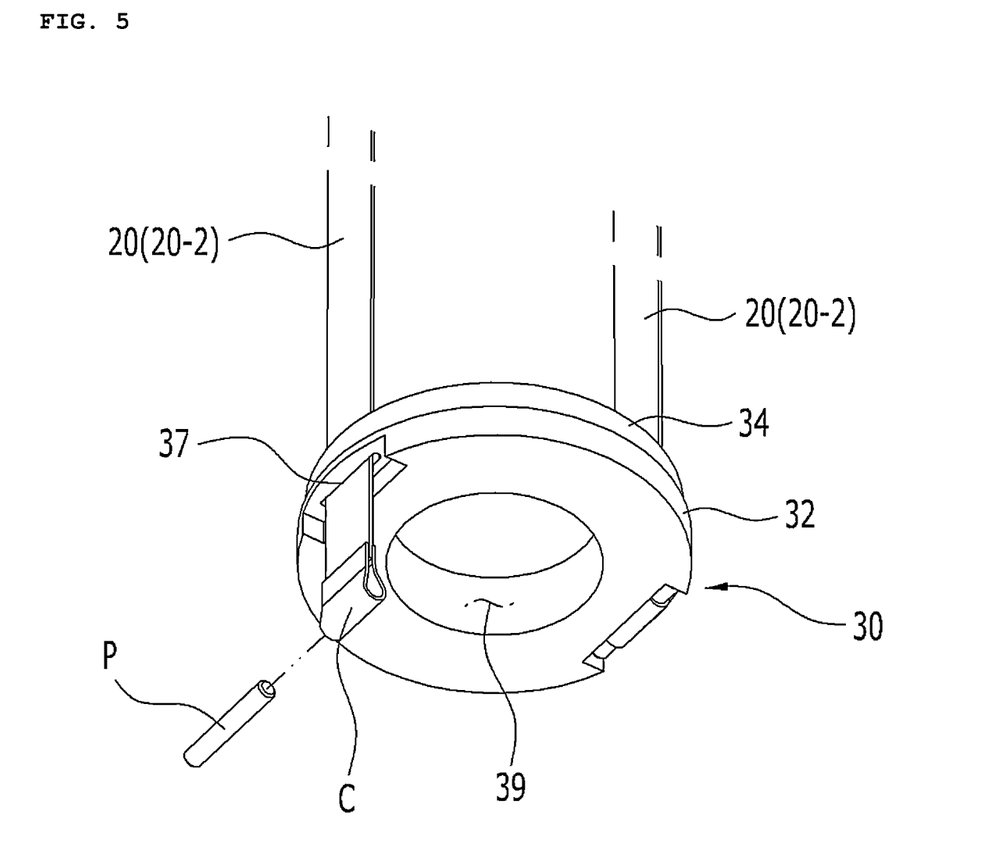
FIG. 5 is a bottom perspective view of a belt rope stator coupled to a bottom of a lowermost joint body among a plurality of joint bodies.
Figure 6:
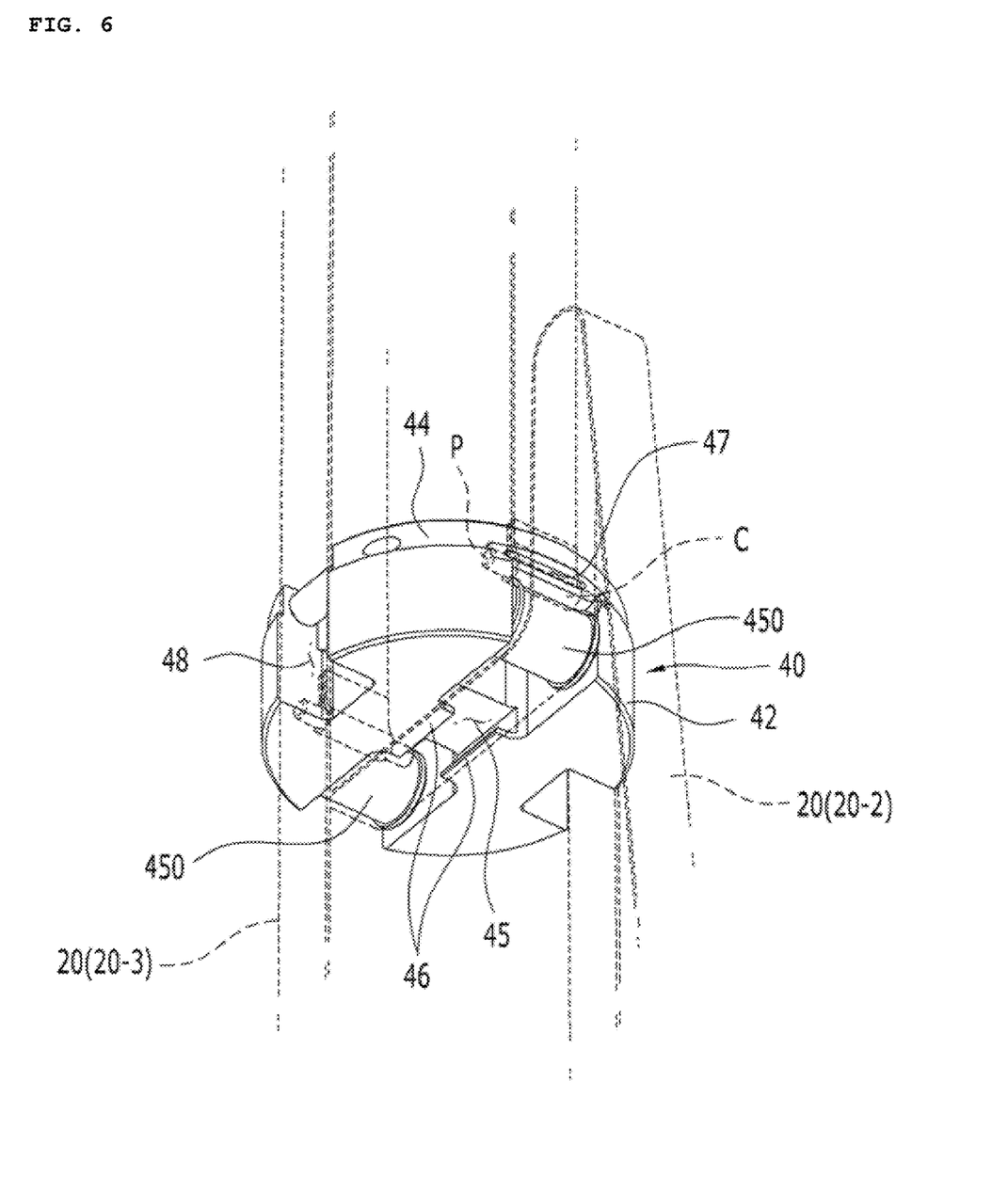
FIG. 6 is a bottom perspective view of a belt rope guide coupled to a bottom of each joint body excluding a lowermost joint body.

FIG. 5 is a bottom perspective view of a belt rope stator coupled to a bottom of a lowermost joint body among a plurality of joint bodies, and FIG. 6 is a bottom perspective view of a belt rope guide coupled to a bottom of each joint body excluding the lowermost joint body.

First, as shown in FIG. 5, the belt rope stator 30 may have a configuration in which a body part 32 and a stator insertion part 34 having a relatively small diameter at a top of the body part 32 are integrally provided. Here, the stator insertion part 34 may be inserted into and fixed to a bottom of the lowermost joint body 10-1 so as to allow the belt rope stator 30 to be firmly coupled to the lowermost joint body 10-1.

In addition to a press-fitting method, a screw coupling method in which threads are disposed on an outer peripheral surface of the stator insertion part 34 and a lower inner peripheral surface of the lowermost joint body 10-1, respectively, to connect them to each other, an adhesive coupling method using an adhesive, and a bolt coupling method using bolts, and the like may be applied to a method of coupling the belt rope stator 30 to a bottom of the lowermost joint body 10-1 through the stator insertion part 34.

In one side of the belt rope stator 30 and the other side on an opposite portion thereof, stator belt fixing holes 37 in which one end and the other end of the first interlocking belt rope 20-2 extending downward by passing into the lowermost joint body 10-1 are respectively passed therethrough and then fixed with fixing pins P may be disposed. Here, curling parts C may be disposed at one end and the other end of the first interlocking belt rope 20-2 to allow the fixing pin P to be inserted therein.

As shown in FIG. 6, the belt rope guide 40 may have a configuration in which a body part 42 and a guide insertion part 44 having a relatively small diameter at a top of the body part 42 are integrally provided. In the belt rope guide 40, the guide insertion part 44 may be inserted into and fixed to a bottom of each joint body 10-2, 10-3, . . . so as to be firmly coupled to the corresponding joint body 10-2, 10-3, . . . .

In addition to a press-fitting method, a screw coupling method in which threads are disposed on an outer peripheral surface of the stator insertion part 34 and a lower inner peripheral surface of the lowermost joint body 10-1, respectively, to connect them to each other, an adhesive coupling method using an adhesive, and a bolt coupling method using bolts, and the like may be applied to a method of coupling the belt rope guide 40 to a bottom of each joint body 10-2, 10-3, . . . .

A belt coupling part 45 surrounded by a belt detachment prevention member 46 may be disposed continuously from one side to the other side on a lower surface of the belt rope guide 40. Furthermore, in one side thereof and the other side on an opposite portion thereof, guide belt fixing holes 47 in which one end and the other end of the interlocking belt rope 20 extending downward by passing into the joint body 10 are respectively passed therethrough and then fixed with fixing pins P may be disposed.

Support rollers 450 may be provided in one side and the other side of the belt coupling part 45 to support the interlocking belt rope 20 coupled to the belt coupling part 45 so as to be stably displaced, and belt passage grooves 48 may be disposed in one side of an outer surface portion of the belt rope guide 40 and the other side on an opposite portion thereof to provide a path for another interlocking belt rope 20 to pass therethrough. Here, a roller (symbol omitted) may also be provided in the belt passage groove 48.

Even at one end and the other end of the interlocking belt rope 20 that are passed through the guide belt fixing holes 47 of the belt rope guide 40 from the top to the bottom and fixed with fixing pins P, curling parts C formed by rounding the ends of the belt rope 20 and sewing or joining them to allow the fixing pins P to be inserted therein may be disposed in a similar manner to a configuration of fixing the first interlocking belt rope 20-2 to the belt rope stator 30.

The belt coupling part 45 and belt passage groove 48 of one belt rope guide 40 and the belt coupling part 45 and belt passage groove 48 of another belt rope guide 40 positioned at one stage thereabove or therebelow may be disposed at different positions (see FIG. 1).

For example, the belt coupling part 45 and belt passage groove 48 of one belt rope guide 40 and the belt coupling part 45 and belt passage groove 48 of another belt rope guide 40 positioned at one stage thereabove or therebelow may be disposed to be offset from each other by 90 degrees, and in this case, the belt ropes 20 that are adjacent above and below may be prevented from overlapping each other to interfere with the operation or twisting each other.

Drainage holes 39, 49 may be disposed in each of the belt rope stator 30 and the belt rope guide 40 as described above. Even if rainwater is infiltrated into the master through the drainage holes 39, 49, the drainage of the infiltrated rainwater may be efficiently implemented.

Figure 7A:
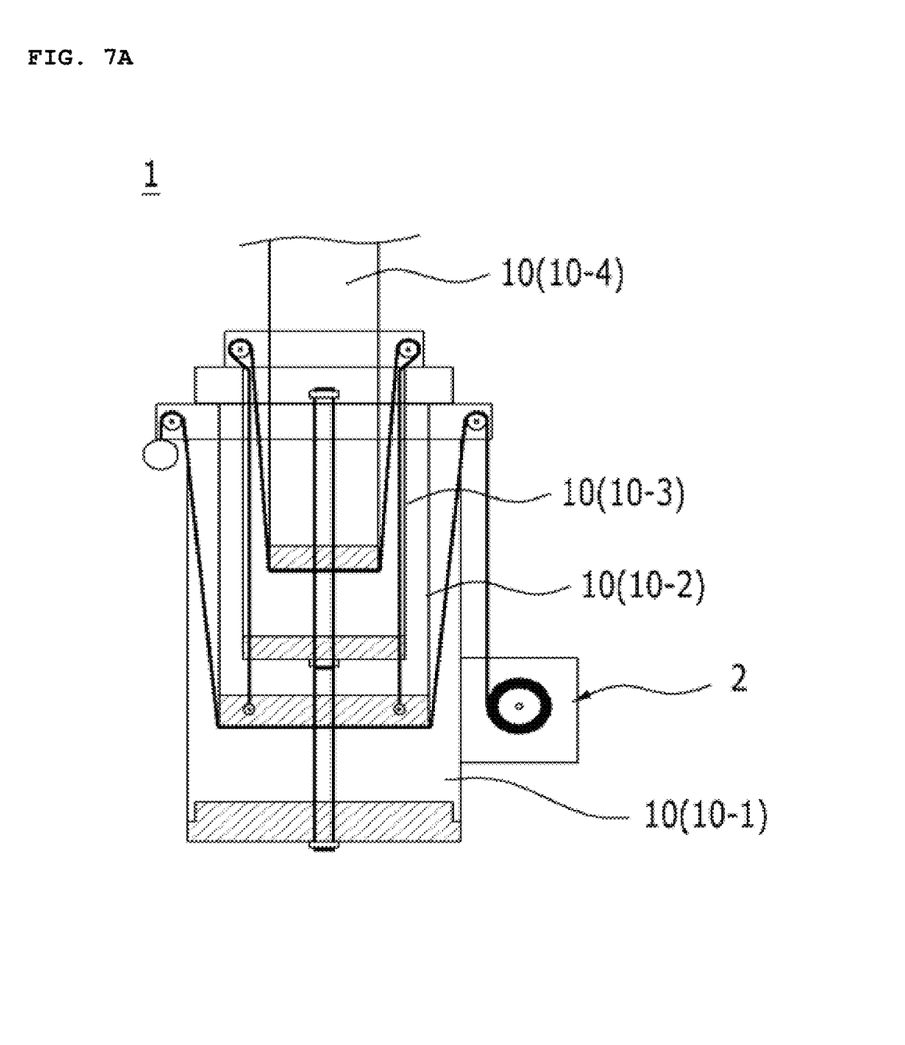
FIGS. 7A and 7B are schematic diagrams for explaining an operation of a telescopic mast with built-in belt ropes according to an embodiment of the present disclosure.
Figure 7B:
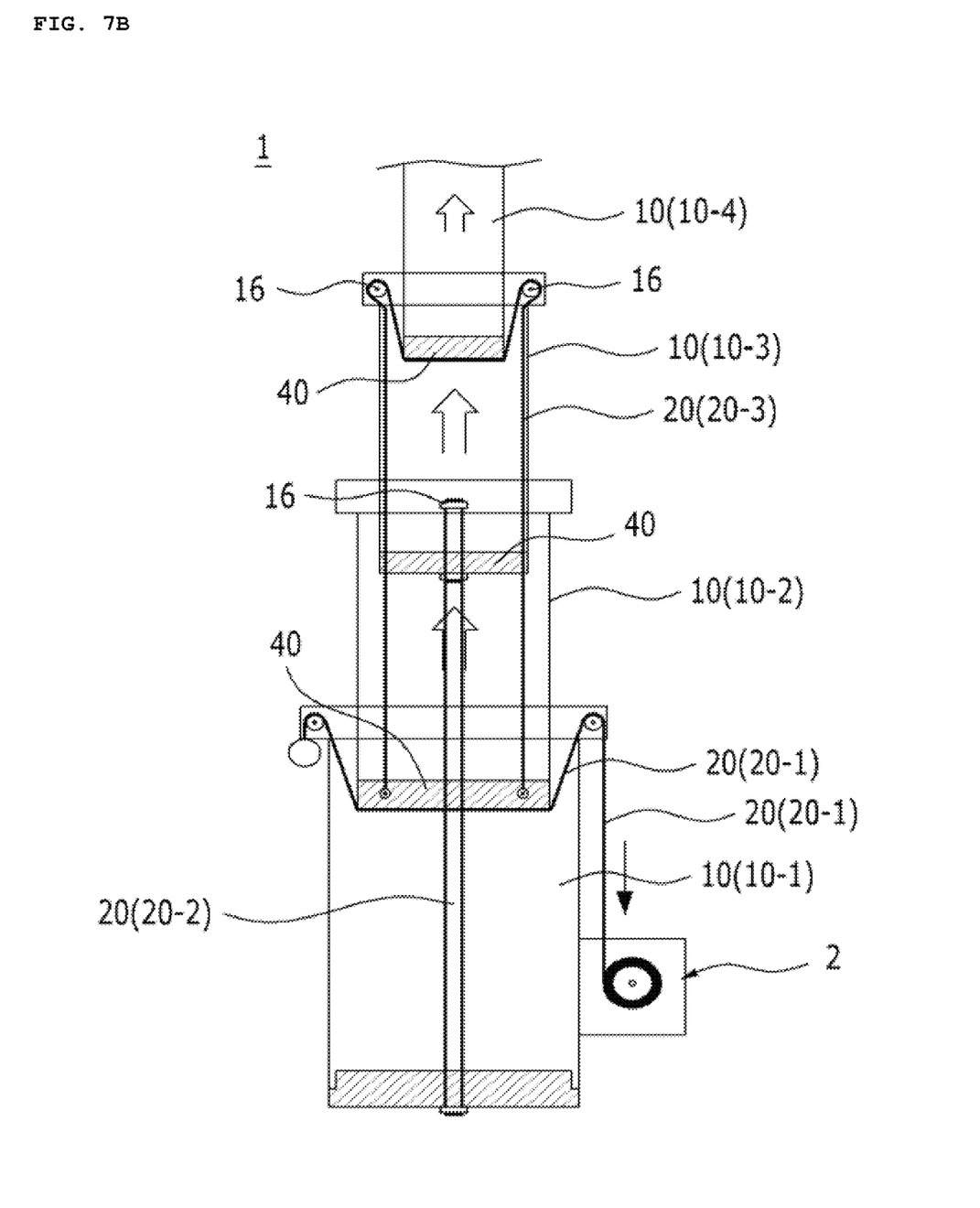

FIGS. 7A and 7B are schematic diagrams for explaining an operation of a telescopic mast with built-in belt ropes according to an embodiment of the present disclosure, wherein FIG. 7A is a schematic diagram showing the telescopic mast with built-in belt ropes in a contracted state prior to being lifted (extended), and FIG. 7B is a schematic diagram showing simultaneous elevation by an external drive device such as a winch.

When the winch 2 is driven to lift (extend) the mast 1 in a lowered (contracted) state in which the plurality of joint bodies 10 are allowed to overlap as shown in FIG. 7A, a portion of the drive belt rope 20-1 positioned inside the lowermost joint body 10-1 is tightened upward as the drive belt rope 20-1 is wound around the winch 2, and due to this, the second joint body 10-2 connected to the driving belt rope 20-1 is lifted through the belt rope guide 40 as shown in FIG. 7B.

When the second joint body 10-2 is lifted in this manner, a tensile force is applied to the first interlocking belt rope 20-2 fixed to the belt rope guide 40 of the third joint body 10-3 at an upper stage thereof and the belt rope stator 30 at a bottom of the lowermost joint body 10-1 to allow a portion of the first interlocking belt rope 20-2 positioned inside the second joint body 10-2 to be tightened upward, and as a result, the third joint body 10-3 is also lifted (drawn out from the second joint body 10-2).

The fourth joint body 10-4 at a stage immediately above the third joint body 10-3 is also drawn out from the third joint body 10-3 in connection with the lifting of the third joint body 10-3 in the same manner as the lifting of the third joint body 10-3, and the lifting of the joint bodies 10 is carried out simultaneously from the second joint body 10-2 to the uppermost joint body 10 so as to lift (extend) the mast 1.

That is, in the telescopic mast 1 with built-in belt ropes according to an embodiment of the present disclosure, when the second joint body 10-2 at a stage immediately above the lowermost joint body 10-1 is lifted by an external drive device, the joint bodies 10 at upper stages are lifted simultaneously to ultimately lift the uppermost joint body, thereby levitating a video or communication apparatus mounted on the uppermost joint body to a predetermined height from the ground.

As described above, in a telescopic mast with built-in belt ropes according to an embodiment of the present disclosure, the belt ropes that operate joint bodies simultaneously may not be exposed to the outside as they are built into the joint bodies, and due to this, rapid deterioration of the belt ropes occurring when the belt ropes are exposed to an external environment and subsequent serious damage that affects safety during the use of the apparatus may be prevented.

In the above detailed description of the present disclosure, only special embodiments thereof have been described. However, it should be understood that the present disclosure is not limited to the particular form mentioned in the detailed description, but rather is understood to include all modifications, equivalents and substitutes within the concept and scope of the present disclosure as defined by the appended claims.

DESCRIPTION OF SYMBOLS

1: Mast 2: Winch (external drive device)
10: Joint body 12: Collar part
14: Roller insertion part 16: Guide roller
17: Slit 18: Elevation guide groove
20: Belt rope 20-1: Drive belt rope
20-2, 20-3: Interlocking belt rope 30: Belt rope stator
32: Belt rope stator body 34: Stator insertion part
37: Stator belt fixing hole 40: Belt rope guide
42: Belt rope guide body part 44: Guide insertion part
45: Belt coupling part 46: Belt detachment prevention member
47: Guide belt fixing hole 48: Belt passage groove

The invention claimed is:

1. A telescopic c mast with built-in belt ropes, the telescopic mast comprising:
    a plurality of joint bodies having different outer diameters in a hollow tube structure;
    a plurality of belt ropes connecting the plurality of joint bodies in order to operate the joint bodies simultaneously;
    collar parts coupled to tops of the respective joint bodies, in which guide rollers that guide the movement of the belt ropes are embedded in one side and the other side on an opposite portion thereof;
    a belt rope stator coupled to a bottom of a lowermost joint body having the largest diameter among the plurality of joint bodies, to which both ends of any one belt rope are fixed; and
    belt rope guides coupled to bottoms of the respective joint bodies excluding the lowermost joint body, to which both ends of any one belt rope are fixed and the other belt rope is movably coupled,
    wherein the plurality of joint bodies are assembled to overlap one another to constitute a telescopic structure whose length is adjustable,
    wherein the remaining belt ropes excluding a lowermost belt rope among the plurality of belt ropes connect two joint bodies spaced apart from each other in an interlocking manner with one joint body in the middle therebetween, and
    wherein the belt ropes connecting two joint bodies spaced apart from each other pass into a joint body positioned between the two joint bodies to be connected so as not to be exposed to the outside.

2. The telescopic mast of claim 1, wherein the plurality of belt ropes consists of one drive belt rope and a plurality of interlocking belt ropes.

3. The telescopic mast of claim 2, wherein at least portion of the drive belt rope is movably coupled to a belt rope guide coupled to a bottom of a second joint body at one stage above a lowermost joint body, and the other portion passes through a collar part of the lowermost joint body such that either one of both ends thereof is fixed to the collar part and the other end thereof is connected to an external drive device.

4. The telescopic mast of claim 2, wherein at least portion of the plurality of interlocking belt ropes is movably coupled to a belt rope guide of the any one joint body, and both ends thereof pass into a joint body positioned in the middle to be fixed to a belt rope guide or belt rope stator of a joint body positioned two stages below.

5. The telescopic mast of claim 1, wherein the belt rope stator is integrally provided with a stator insertion part inserted into and fixed to a bottom of a lowermost joint body at a top thereof, and stator belt fixing holes in which one end and the other end of a belt rope extending by passing into a joint body are respectively passed therethrough and then fixed with fixing pins in one side thereof and the other side on an opposite portion thereof.

6. The telescopic mast of claim 1, wherein the belt rope guide is integrally provided with a guide insertion part inserted into and fixed to a bottom opening of a joint body at a top thereof, disposed with a belt coupling part surrounded by a belt detachment prevention member on a lower surface thereof, provided with guide belt fixing holes in which one end and the other end of a belt rope extending by passing into a joint body are respectively passed therethrough and then fixed with fixing pins in one side thereof and the other side on an opposite portion thereof, and disposed with belt passage grooves in one outer surface portion thereof and the other outer surface portion on an opposite portion thereof.

7. The telescopic mast of claim 6, wherein the positions of the belt coupling part and belt passage groove of any one belt rope guide are different from those of another belt rope guide positioned at one stage above or below.

8. The telescopic mast of claim 1, wherein one or more drainage holes are disposed in the belt rope stator and the belt rope guide.

9. The telescopic mast of claim 1, wherein at least two or more elevation guide grooves are disposed on an inner peripheral surface of each of the collar parts in a longitudinal direction of the joint body, and
    wherein an elevation rail corresponding to the elevation guide groove is disposed in an outer surface portion of each of the remaining joint bodies excluding the lowermost joint body in a longitudinal direction of the joint body.

* * * * *